United States Patent Office 3,598,862
Patented Aug. 10, 1971

3,598,862
2 - [4 - (3',5' - DIPHENYLCYCLOHEXYL) - PHE-
NOXY]LOWER ALIPHATIC MONOCARBO-
CYLIC ACIDS AND ESTERS THEREOF
Rudolf G. Griot, Florham Park, N.J., assignor to
Sandoz-Wander, Inc.
No Drawing. Filed July 8, 1968, Ser. No. 743,056
Int. Cl. C07c 69/76, 65/00, 39/12
U.S. Cl. 260—473                           3 Claims

ABSTRACT OF THE DISCLOSURE

The invention relates to 2-[4-(3',5'-diphenylcyclohexyl)-phenoxy] lower aliphatic monocarbocylic acids and the corresponding lower alkyl esters, and to a process for their production. The compounds are useful as hypolipidemics.

This invention relates to derivatives of aliphatic acids. In particular the invention pertains to 2-[4-(3',5'-diphenylcyclohexyl)-phenoxy] lower aliphatic monocarbocylic acids and the corresponding lower alkyl esters. The invention also relates to intermediates useful in preparing said acids and esters as well as processes for preparing said intermediates and said acids and esters.

The substituted aliphatic acids and esters of the present invention may be represented structurally as follows:

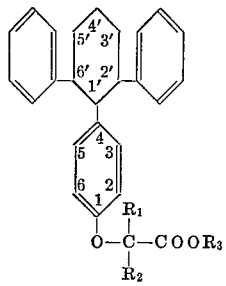

I wherein each of

R₁ and R₂ independently represents hydrogen or straight chain lower alkyl preferably containing from 1 to 4 carbon atoms, i.e., methyl, ethyl, propyl, and butyl; and
R₃ represents hydrogen or straight or branched chain lower alkyl preferably containing from 1 to 4 carbon atoms, e.g., methyl, ethyl, propyl, isopropyl or butyl.

The compounds of Formula I are most conveniently prepared by reacting an alkali-metal salt of 4-(3',5'-diphenylcyclohexyl)phenol with an appropriate 2-halo substituted aliphatic acid or ester as illustrated by the following reaction scheme:

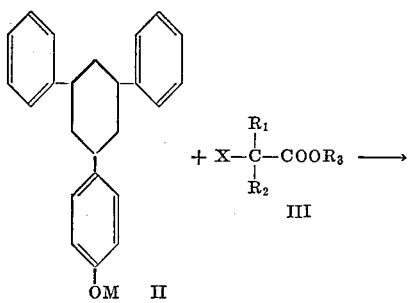

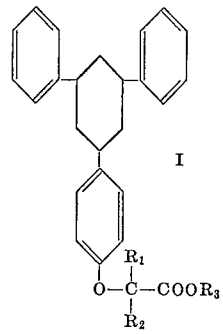

I wherein R₁, R₂ and R₃ are as defined, X represents halogen having an atomic weight of from 35 to 127, i.e., chloro, bromo and iodo, and M represents an alkali-metal preferably sodium or potassium.

The above process is conveniently carried out in an inert organic solvent and at elevated temperatures. Preferably the reaction is carried out at a temperature of from about 20° C. to about 130° C. and in the same solvent employed for the preparation of the alkali-metal salt derivative of Formula II from the corresponding phenol discussed in further detail hereinafter. The resulting product (I) is readily recovered in conventional manner.

It will be readily appreciated by one skilled in the art that the compounds of Formula I wherein R₃ is hydrogen, i.e., the free acids, may also be obtained from the corresponding esters of Formula I (i.e., where R₃ is alkyl) by simple basic hydrolysis of the ester in conventional manner. The hydrolysis is conveniently carried out by treating the ester with an alcoholic solution of an alkali-metal hydroxide, e.g., potassium hydroxide in methanol.

Various of the 2-halo substituted alkanoic acids and esters of Formula III employed in the above-illustrated process are known and can be prepared by methods described in the literature. Such others which may not be specifically described in the literature can be prepared from available material in analogous manner.

The alkali-metal salts of 4-(3',5'-diphenylcyclohexyl) phenol (Formula II) are conveniently prepared by reacting the corresponding phenol with an alkali-metal hydride, e.g., sodium hydride or potassium hydride, at room temperature (20–25° C.) in an inert substantially anhydrous organic solvent. Suitable solvents include dimethylacetamide, diethylacetamide and dimethylformamide. As previously indicated hereinabove the solvent employed in preparing the phenolate is preferably employed in carrying out the subsequent reaction of the phenolate (II) with the appropriate 2-halo substituted alkanoic acid or ester (III). The preparation of the phenol, i.e., 4-(3',5'-diphenylcyclohexyl)phenol is illustrated in Example 1 hereinafter.

The compounds of Formula I are useful because they possess pharmacological activity in animals. In particular, the compounds are useful as hypolipidemic agents having hypocholesteremic and/or hypotriglyceridemic activity, as indicated by tests on a group of white rats which are given 10–50 mg. per kg. of body weight per diem of the compound orally, for six days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H.B., Anal. Biochem. 9:393 (1964): (Technicon method N 24a): and Kessler, G., and Lederer, H. Technicon Symposium, Mediad Inc., New York, pages 345–347 (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.05 gram to about .4 gram of the compound, and the dosage forms suitable for internal use comprise from about 12.5 milligrams to about 200 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents, and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxy-benzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hardfilled capsules and tablets.

The compounds of Formula I wherein $R_3$ is hydrogen (i.e. free acids) may be similarly administered in the form of their non-toxic pharmaceutically acceptable salts. Such salts do not materially differ from the free acid forms in their pharmacological effect and are included within the scope of the invention. As illustrative of such salts there may be included aluminum salt; non-toxic alkali metal salts, e.g., potassium and sodium salts; non-toxic alkaline earth metal salts, e.g., magnesium and calcium salts; salts with N-containing bases such as ammonium salts and pharmaceutically acceptable primary, secondary and tertiary amine salts, e.g., ethanol amine salts, diethanol amine salts, and the like. Such salts are prepared in conventional manner.

A representative formulation is a tablet prepared by conventional tabletting techniques and containing the following ingredients:

| Ingredient: | Weight (mg.) |
|---|---|
| 2 - methyl - 2 - [4-(3',5'-diphenylcyclohexyl) phenoxy]propionic acid | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

2-methyl-2-[4-(3',5'-diphenylcyclohexyl)phenoxy] propionic acid

Step A: Preparation of 4-(p-methoxyphenyl)-2-oxo-6-phenyl-3-cyclohexene-1-carboxylic acid ethyl ester.—To a solution of 93 g. of 4'-methoxychalcone (a known compound) prepared by reaction of p-methoxyacetophenone and benzaldehyde dissolved in 6.5 liters absolute ethanol containing 54 g. anhydrous potassium carbonate is added 63.5 g. ethyl acetoacetate. The resulting mixture is stirred at room temperature (20° C.) for 22 hours, evaporated in vacuo to a thick slurry which is treated with 500 ml. methylene chloride. The resulting solution is filtered and the filtrate evaporated in vacuo to obtain a viscous oil which is taken up in 350 ml. 95% ethanol. The crude product is crystallized from the ethanol and recrystallization from ethanol gives 4-(p-methoxyphenyl)-2-oxo-6-phenyl-3 - cyclohexene-1-carboxylic acid ethyl ester, M.P. 105.5–107° C.

Step B: Preparation of 3-(p-methoxyphenyl)-5-phenyl-2-cyclohexen-1-one.—To a solution of 43 g. of 4-(p-methoxyphenyl) - 2 - oxo-6-phenyl-3-cyclohexene-1-carboxylic acid ethyl ester dissolved in 860 ml. acetic acid is added 430 ml. hydrochloric acid. The resulting mixture is refluxed overnight, evaporated in vacuo to obtain a crude oil which is dissolved in 500 ml. methylene chloride. The resulting solution is washed first with 200 ml. water, then 200 ml. saturated sodium bicarbonate solution, and again with 200 ml. water. The organic phase is dried over anhydrous magnesium sulfate, evaporated in vacuo to remove solvent, and the resulting solid twice crystallized from 350 ml. ethanol to obtain yellow needles of 3 - (p - methoxyphenyl)-5-phenyl-2-cyclohexen-1-one, M.P. 103–104° C.

Step C: Preparation of 3-(p-hydroxyphenyl)-5-phenyl-2-cyclohexen-1-one.—To a solution of 2.8 g. of 3-(p-methoxyphenyl)-5-phenyl-2-cyclohexen-1-one, dissolved under reflux in 50 ml. xylene is added a total of 2.32 g. of aluminum chloride in three separate additions. The resulting mixture is refluxed for 5 hours, cooled to 0° C., and poured onto 100 ml. crushed ice. The organic phase is separated, and dried over anhydrous magnesium sulfate. Crystallization occurs on evaporation in vacuo of the organic phase and the solid obtained is recrystallized from 95% ethanol to obtain 3-(p-hydroxyphenyl)-5-phenyl-2-cyclohexen-1-one, M.P. 201.5–203° C.

Step D: Preparation of 3-(p-hydroxyphenyl)-1,5-diphenyl-2-cyclohexen-1-ol.—A solution of 26.4 g. of 3-(p - hydroxyphenyl)-5-phenyl-2-cyclohexen-1-one in 100 ml. of tetrahydrofuran is added, over a period of 1 hour at −5° to 0° C., to an excess of phenylmagnesium bromide (prepared by reacting 78.5 g. of bromobenzene with 12.5 g. of magnesium turnings in 1.5 liters of tetrahydrofuran). The reaction mixture is then stirred at room temperature for 24 hours and then cooled to −10° C. and treated with 300 ml. of a saturated aqueous ammonium chloride solution. The tetrahydrofuran is then evaporated in vacuo at a bath temperature of 30° to 40° C. and to the residue is added 1 liter of diethyl ether. The layers are separated and the organic phase extracted twice with 200 ml. (each) of 1 N sodium hydroxide. The extracts are combined and acidified with 60 ml. of concentrated hydrochloric acid. The acidified extract is then extracted twice with 200 ml. (each) of diethyl ether and the combined ether extracts washed first with 100 ml. of water, then with 100 ml. of a saturated aqueous sodium bicarbonate solution and then dried over anhydrous magnesium sulfate and evaporated to obtain 3-(p-hydroxyphenyl)-1,5-diphenyl-2-cyclohexen-1-ol, M.P. 98° C. (after crystallization from hexane).

Step E: Preparation of 3,5-diphenyl-1-(p-hydroxyphenyl)cyclohexane.—To a solution of 3-(p-hydroxyphenyl)-1,5-diphenyl-2-cyclohexen-1-ol (obtained from Step D) in 75 ml. of glacial acetic acid is added 2.0 g. of a 5% palladium on charcoal catalyst and the mixture hydrogenated at a temperature of 60° C. under 1500 p.s.i. hydrogen pressure. After the stoichiometric amount of hydrogen has been consumed (approximately 12 hours) the mixture is filtered and the solvent evaporated in vacuo. The residue is dissolved in ethyl acetate and the resulting solution washed twice first with 50 ml. (each) of a saturated aqueous sodium bicarbonate solution and then twice with 100 ml. (each) of water and then dried over anhydrous magnesium sulfate and evaporated to obtain 3,5-diphenyl-1-(p-hydroxyphenyl)cyclohexane.

Step F: Preparation of 2-methyl-2-[4-(3′,5′-diphenylcyclohexyl)phenoxy]propionic acid ethyl ester.—To 4.8 g. of sodium hydride (50% suspension in mineral oil) suspended in 200 ml. of dry dimethylacetamide is added portionwise with stirring and at room temperature 31.9 g. of 3,5-diphenyl-1-(p-hydroxyphenyl)cyclohexane. To the resulting mixture is added 20 g. of ethyl bromoisobutyrate and the mixture heated at 100° C. on a water bath for 24 hours. The solvent is then evaporated in vacuo and the residue taken up in 200 ml. of diethyl ether. The ether solution is then washed first with 200 ml. of water, then with 200 ml. of a saturated aqueous sodium bicarbonate solution and then dried over anhydrous magnesium sulfate. The ether is then evaporated off to obtain 2-methyl-2-[4-(3′,5′-diphenylcyclohexyl)phenoxy]propionic acid ethyl ester.

Step G: Preparation of 2-methyl-2-[4-(3′,5′-diphenylcyclohexyl)-phenoxy]propionic acid.—A mixture of 9 g. of 2-methyl-2-[4-(3′,5′ - diphenylcyclohexyl)-phenoxy]propionic acid ethyl ester, 2.0 g. of potassium hydroxide and 40 ml. of methanol is allowed to stand at room temperature for 3 days. The solvent is then evaporated in vacuo and the residue dissolved in water. The resulting solution is extracted twice with 50 ml. (each) of diethyl ether, and the combined ether extracts then acidified with 20 ml. of 2 N hydrochloric acid and extracted three times with 50 ml. (each) of a saturated aqueous sodium chloride solution. The organic phase is then dried over anhydrous magnesium sulfate and the solvent evaporated to obtain 2-methyl-2-[4-(3′,5′-diphenylcyclohexyl)phenoxy]propionic acid.

What is claimed is:
1. A compound of formula

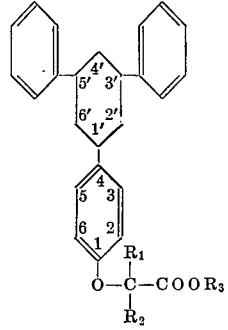

wherein each of $R_1$ and $R_2$ independently represents hydrogen or straight chain lower alkyl and $R_3$ represents hydrogen or straight or branched chain lower alkyl or, when $R_3$ represents hydrogen, the pharmaceutically acceptable salts thereof.

2. A compound of claim 1 which is 2-methyl-2-[4-(3′,5′ - diphenylcyclohexyl)phenoxy]propionic acid or a pharmaceutically acceptable salt thereof.

3. A compound of claim 1 which is 2-methyl-2-[4-(3′,5′-diphenylcyclohexylphenoxy]-propionic acid ethyl ester.

References Cited

Bencze, W. L. et al.: J. Med. Pharm. Chem., 10(2), 138–144 (1967).

JAMES A. PATTEN, Primary Examiner

J. F. TERAPANE, Assistant Examiner

U.S. Cl. X.R.

260—501.17, 520, 590, 619; 424—308, 317